(12) United States Patent
Spayes et al.

(10) Patent No.: US 7,054,535 B2
(45) Date of Patent: May 30, 2006

(54) OPTICAL FIBER MANAGEMENT ASSEMBLY WITH STORAGE TRAYS

(75) Inventors: Martin Jeremy Spayes, Andover (GB); Christopher James Dyer, Winchester (GB)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 10/486,981

(22) PCT Filed: Aug. 16, 2002

(86) PCT No.: PCT/GB02/03810

§ 371 (c)(1),
(2), (4) Date: Jul. 9, 2004

(87) PCT Pub. No.: WO03/017684

PCT Pub. Date: Feb. 27, 2003

(65) Prior Publication Data

US 2004/0247277 A1  Dec. 9, 2004

(30) Foreign Application Priority Data

Aug. 17, 2001 (GB) .................................... 0120154

(51) Int. Cl.
*G02B 6/00* (2006.01)
(52) U.S. Cl. .................... 385/135; 385/134; 385/147
(58) Field of Classification Search ................ 385/134, 385/135, 147
See application file for complete search history.

(56) References Cited

U.S. PATENT DOCUMENTS 6,226,436 B1 * 5/2001 Daoud et al. ................ 385/135
6,282,360 B1 * 8/2001 Milanowski et al. ........ 385/135
6,311,008 B1 * 10/2001 Foss ............................ 385/135

* cited by examiner

*Primary Examiner*—John D. Lee
*Assistant Examiner*—James D. Stein
(74) *Attorney, Agent, or Firm*—Fay, Sharpe, Fagan, Minnich & McKee, LLP

(57) ABSTRACT

An optical fiber management assembly comprises a support module (12) carrying two or more pivotable optical fiber storage trays (13). The support module has channels in its outer surface for guiding fibers to an entry zone in a first region of its surface to a tray selection zone from which fibers are guided to respective trays.

25 Claims, 16 Drawing Sheets

OPTICAL FIBER MANAGEMENT ASSEMBLY WITH STORAGE TRAYS

The present invention relates to an assembly for use in connecting optical fibres. Such assemblies are known, for example, from GB-A-2282457 and WO-A-97/32231. The former document discloses an assembly comprising a number of trays for storing optical fibres arranged in an aligned bank with each tray being pivotable out of alignment with the others for providing access thereto. Such assemblies have to be very carefully designed in order to avoid any undue bending of the fibres as the trays are pivoted with respect to the remainder of the stack.

WO-A-97/32231 discloses an assembly in which a number of trays are arranged in an aligned stack mounted on a support plate, with the trays being pivotable with respect to the support plate about an axis extending along one edge of the trays adjacent to the support plate to permit access to fibres in the trays. The support plate has a number of open sided grooves in its inner surface, i.e. the surface facing the trays, which may be used for guiding optical fibres between respective trays. Vertical channels at the side of the support plate enable fibres to be guided from one support plate to another.

The present invention provides an optical fibre management assembly comprising a support module and two or more optical fibre storage trays each mounted to the support module so as to be pivotable about an axis extending along one edge of the tray, the support module having means on its outer surface defining open channels for guiding fibres from an entry zone in a first region of the surface of the support module to a tray selection zone from which the fibres are guided to respective trays.

Thus, in contrast to the assembly described above, the fibres may be guided from one tray to another around the outside of the support module. Thus the fibres are readily accessible.

This arrangement is more convenient for the user since the fibres are effectively "wrapped around" the outside of the support modules, without being hindered by the positions of the trays. There is no need for the trays to be removed from the assembly whilst the fibres are routed or re-routed.

As a result of the channels being open, the optical fibres can be inserted into them without the need for any threading through holes or channels. This is particularly advantageous for the storage of uncut optical fibres. Preferred features of the invention are described in claims 2 to 24.

The invention also provides a kit of parts which, when assembled, forms an assembly as described above, as described in claim 25. The depth of one tray is preferably an integral multiple of another tray to permit a plurality of tray combinations.

It is particularly advantageous for the support module to have an arcuate outer surface. If it was flat, it might be necessary for the fibres to turn sharp corners on entry to the trays, which would adversely affect fibre performance. The provision of an arcuate outer surface on the support module enables the fibres to maintain a minimum bend radius throughout their routes, i.e. no sharp bends.

Instead of providing grooves for the guidance of fibres, preferably a series of ribs protrude from the surface of the module for guiding and/or separating fibres. This is another feature which improves the accessibility of the fibres An embodiment of the invention will now be described in detail by way of example only with reference to the accompanying drawings in which.

Figure 1:
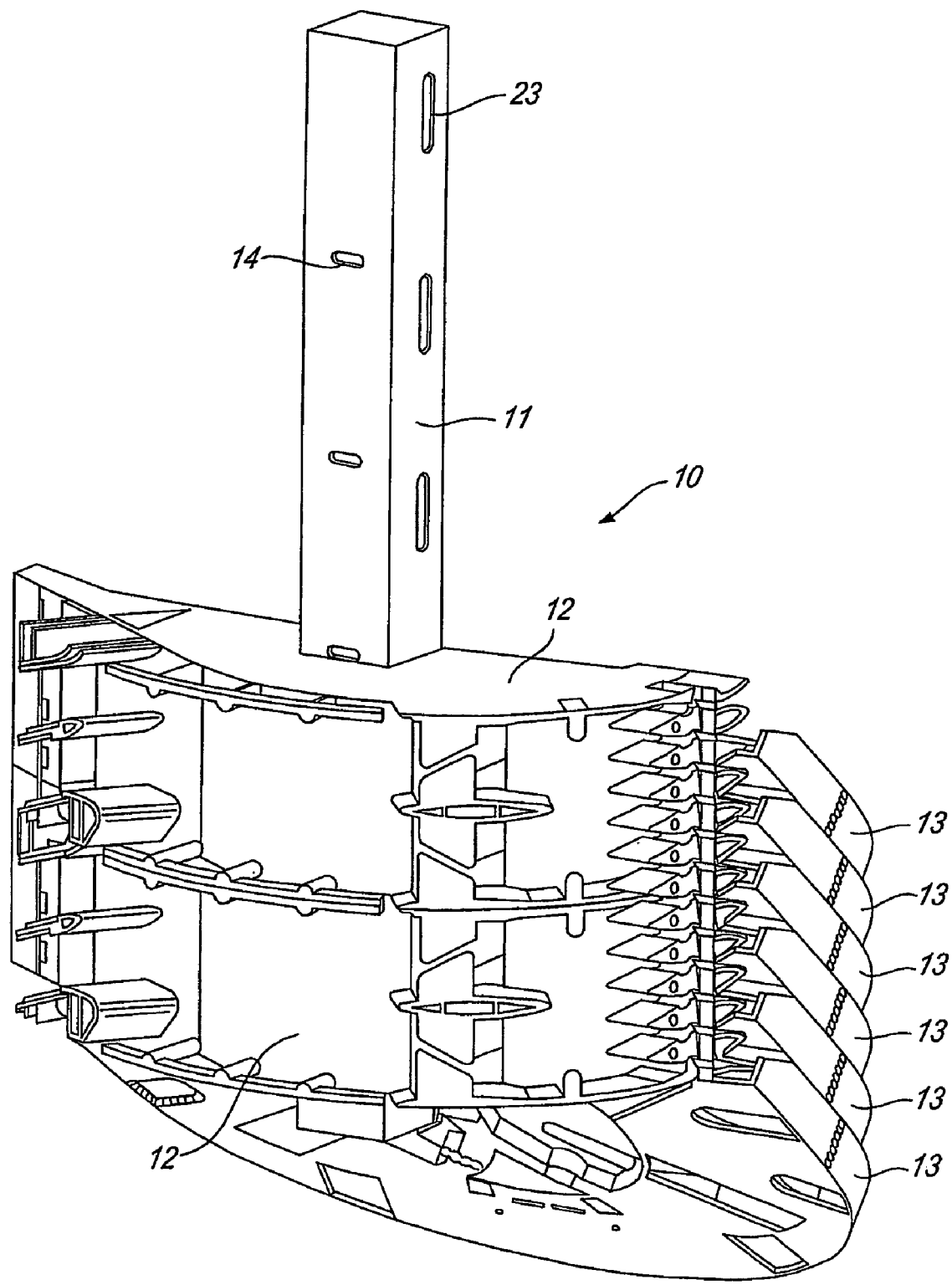
FIG. 1 is a perspective view of an assembly according to the invention, ready for the introduction of optical fibres.

Referring firstly to FIG. 1 the assembly 10 comprises a central support post 11 to which two support modules 12 are attached in a manner to be described in more detail below. (It will be appreciated that in practice only one or more than two modules could present.) Each module 12 caries a number of trays 13 whose function will be described in more detail below. The post 11 is hollow and square in cross section.

Figure 2:
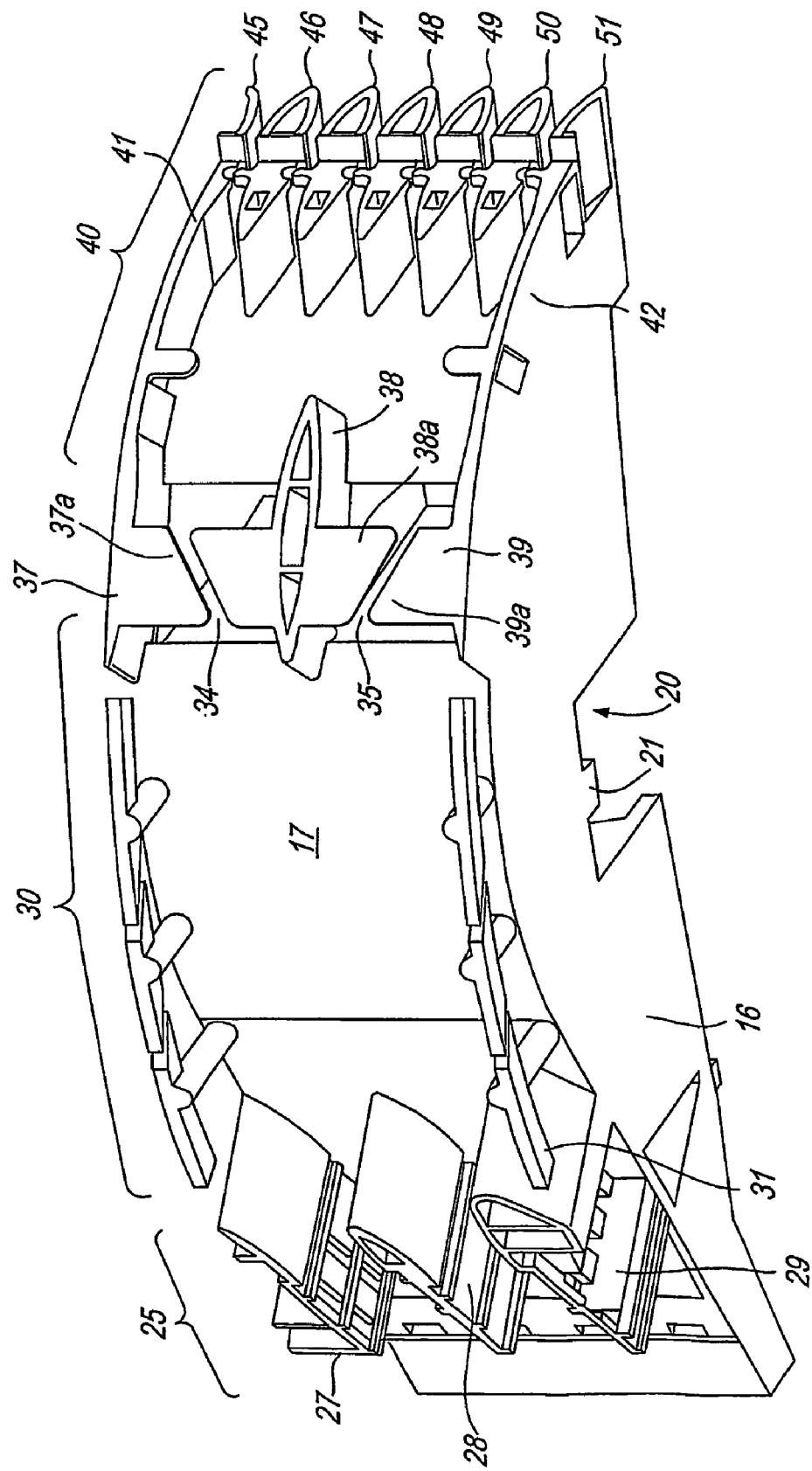
FIG. 2 is an outside perspective view of a single module.
Figure 3:
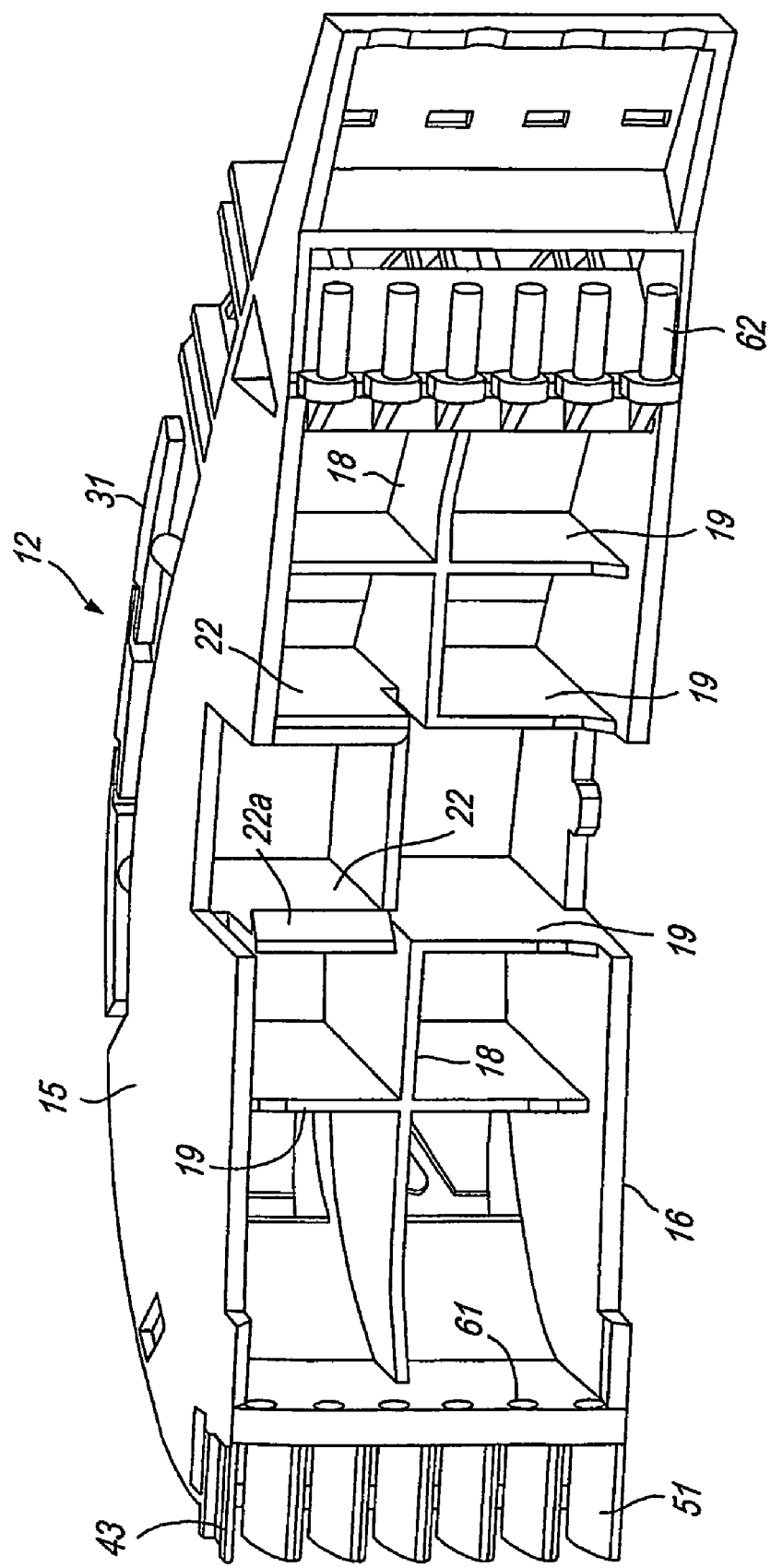
FIG. 3 is an inside perspective view of a single module.

FIG. 2 is a perspective view of a single module 12 as seen from the outside of the finished assembly. FIG. 3 is a perspective view of a single module as seen from the inside. Each module comprises a top plate 15, bottom plate 16 and an arcuate side wall 17. At least a part of the top and bottom plates 15 and 16 overhang the side wall 17. The structure comprising top plate 15, bottom plate 16 and side wall 17 is strengthened by internal ribs 18 extending parallel to the top and bottom plates 15, 16 and internal ribs 19 extending perpendicular to the top and bottom plates. The top and bottom plates 15 and 16 together with internal ribs 19 define a square channel 20 designed to receive the central post 11.

The bottom plate 16 of each module has a tab 21 along one edge of the channel 20 which in use is inserted into a corresponding recess 14 in the central post 11 to prevent the module 12 from being slidable with respect to the post 11. The ribs 19 in the region of the channel 20 define spring clips 22. Each spring clip is in the form of a flexible extension of the corresponding rib 19 having a bevelled surface 22a arranged to cooperate with corresponding protrusions 23 on opposite sides of the central post 11 having cooperating bevelled surfaces which cause the clips 22 to flex outwardly and then latch into place on the post 11.

Referring to FIG. 2, the outside of each module is designed to receive and guide optical fibres to individual trays. The fibres are brought to the module entry zone 25 in so-called buffer tubes which are received in channels defined between a first set of ribs 27, 28, 29 formed in the side wall 17 and/or top and bottom plates 15 and 16. Ribs 27 and 29 may butt against similar ribs on adjacent modules so as to form a complete rib similar to rib 28. The channels are inclined with respect to top and bottom plates 15, 16 as can be seen in the Figures. Except in the region of the ribs 27, 28, 29, the covering comprising the buffer tube is removed and bare fibres are guided around the rest of the assembly.

Figure 4:
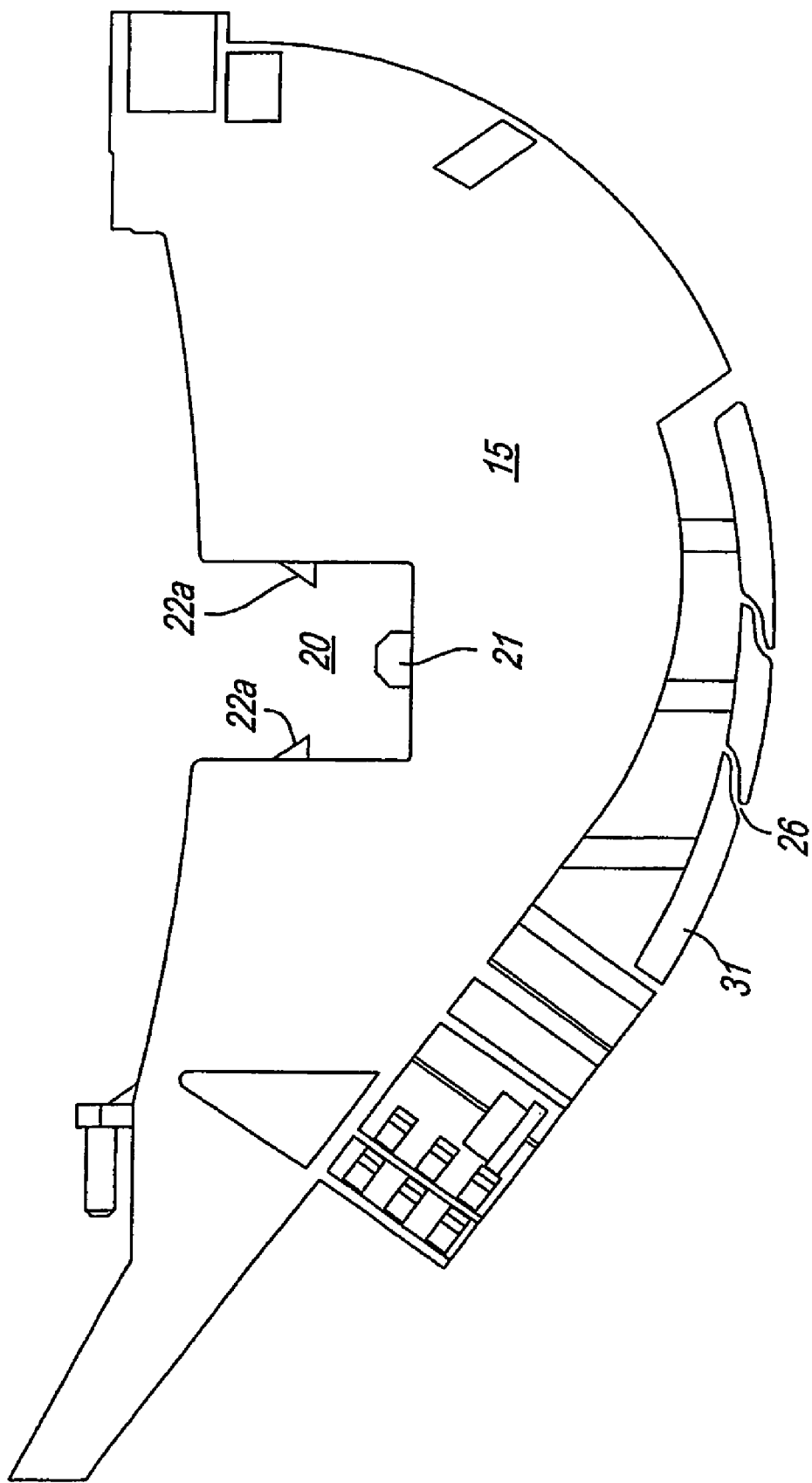
FIG. 4 is a top plan view of a single module.

The bare fibres are led to a distribution zone 30 from where they can either be guided to different modules 12 or they can be guided to the tray selection zone to be described below. In the distribution zone 30, a row of T-posts 31 are provided along the top and bottom plates 15, 16. The T-posts have cooperating stepped profiles with a small gap 26 therebetween in which fibres can be inserted but cannot slide out. This is most clearly visible in FIG. 4.

Figure 14:
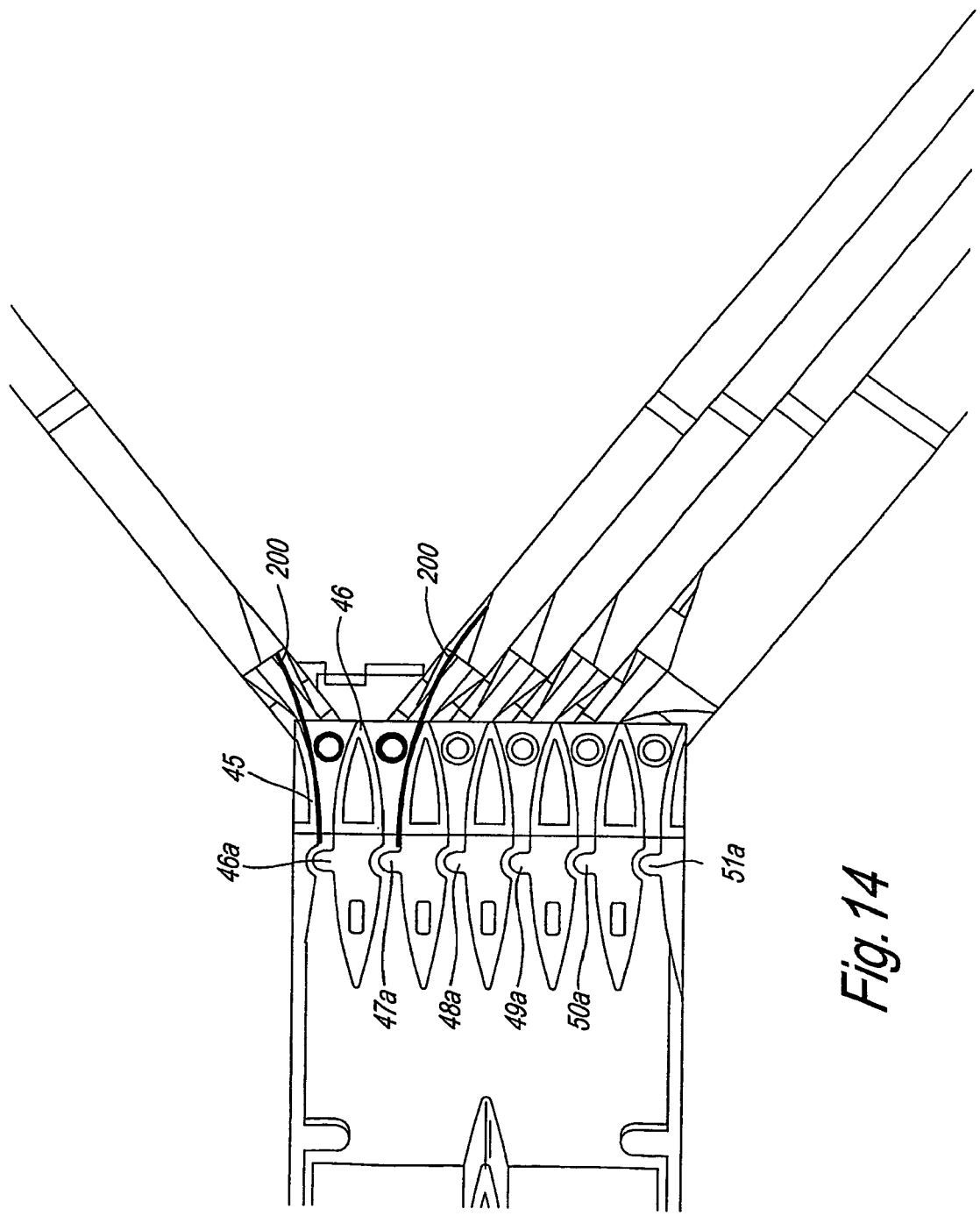
FIG. 14 is an enlarged partial side elevation similar to FIGS. 7 to 10 showing the path of the fibres as they pass from the module 12 to respective trays 13.

Fibres which are not to be guided to other modules 12 enter channels defined between a second set of ribs 37, 38, 39. These ribs have overhanging portions 37a, 38a and 39a extending parallel to the side wall 17 defining narrow channels 34, 35 between which the fibres are inserted. The overhanging portions 37a, 38a, 39a retain fibre within this zone. From here the fibres are led to a tray selection zone 40 ending with a larger number of further channels defined between a third set of ribs 45 to 51 which serve to route the fibres to their appropriate trays 13. The top and bottom plates 15, 16 overhang the side wall in the tray selection zone to define barriers 41, 42 which serve to keep the fibres within the extent of the side wall 17 in the tray selection zone. Referring to FIG. 14, ribs 45 to 50 have an overhang 45a, 46a, 47a, 48a, 49a, 50a, similar to extensions 37a, 38a, and 39a to help keep fibres within the respective channels.

Figure 15:
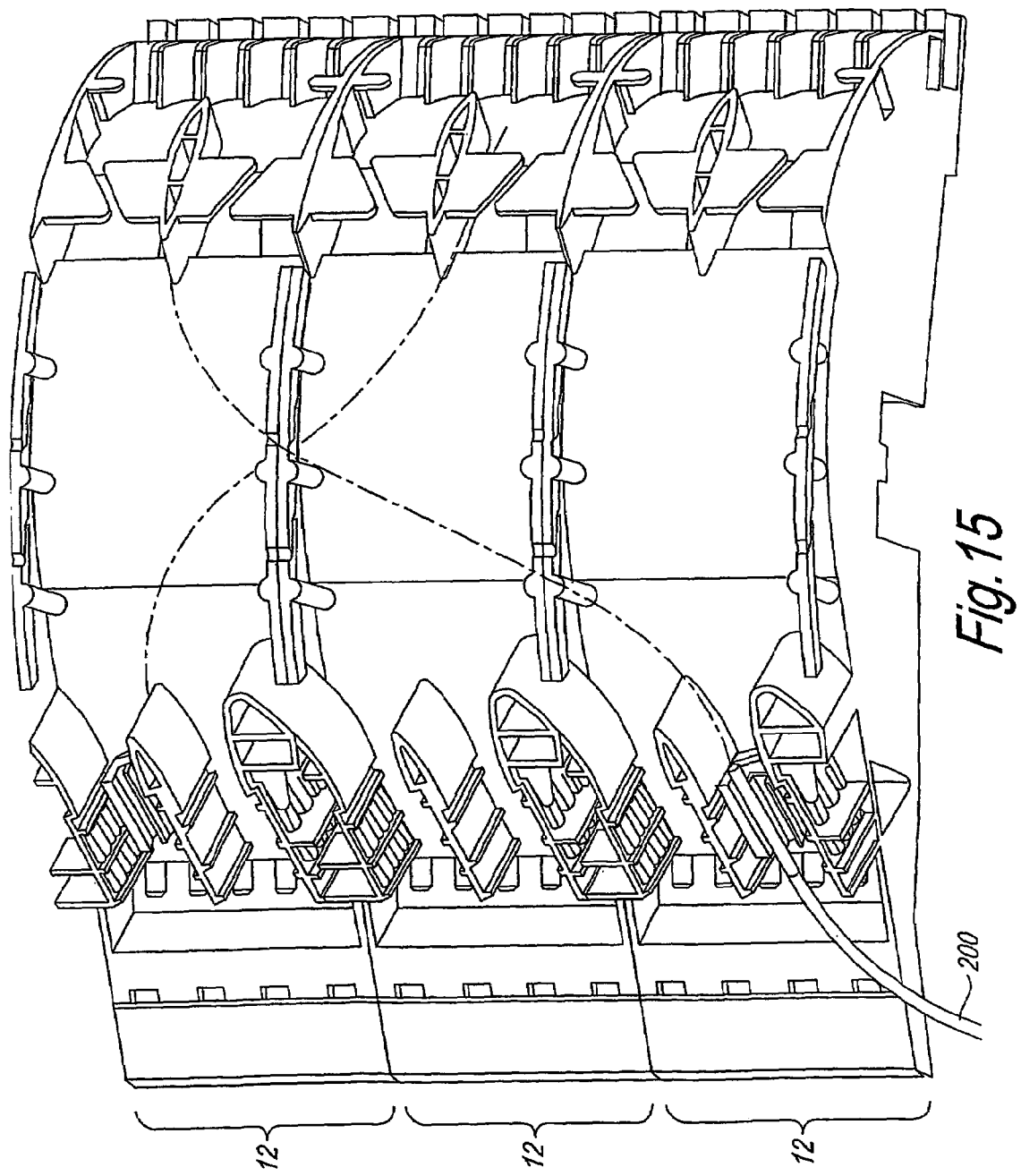
FIG. 15 is a perspective view of a stack of modules showing the paths of fibres passing from one module to another.

It should be noted that the surface of side wall 17 is provided with an open structure for guiding the bare fibres. No threading of fibres through holes is necessary and they can simply be wrapped around the side wall 17. This is shown most clearly in FIG. 15.

Figure 5:
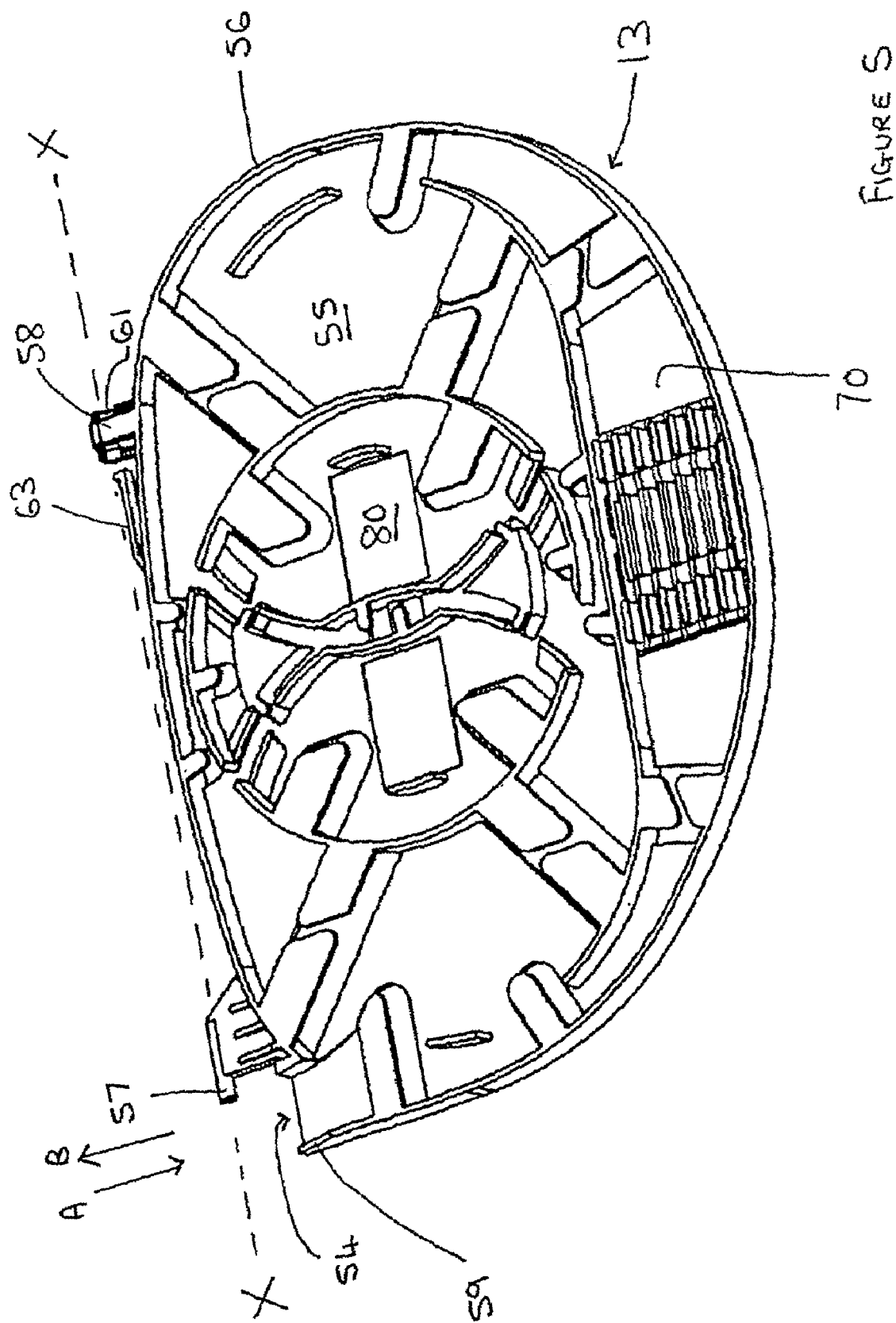
FIG. 5 is a perspective view of a first tray suitable for use with the assembly of FIG. 1.
Figure 11:
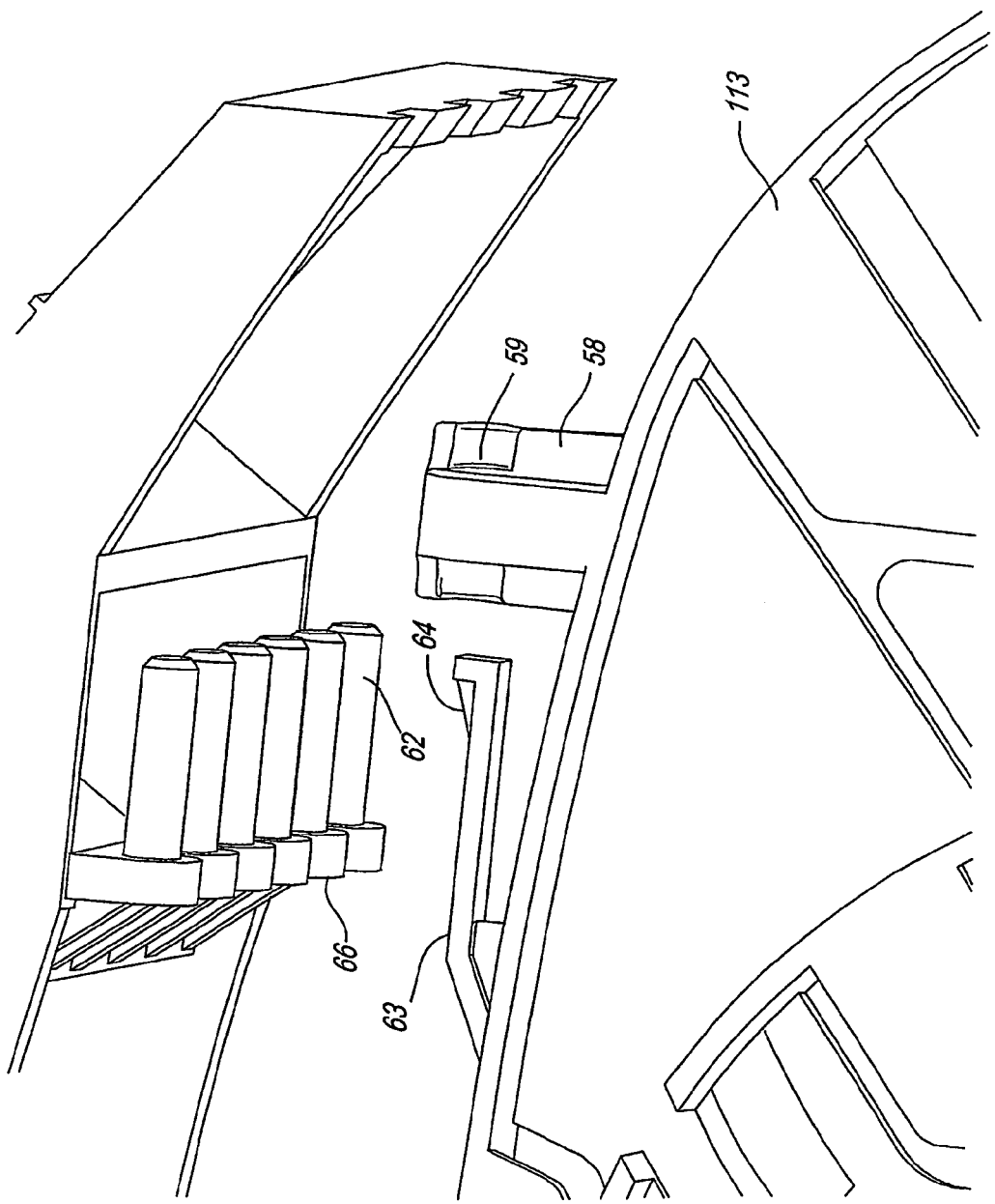
FIG. 11 is an enlarged partial perspective view illustrating a tray and a module prior to attachment.
Figure 12:
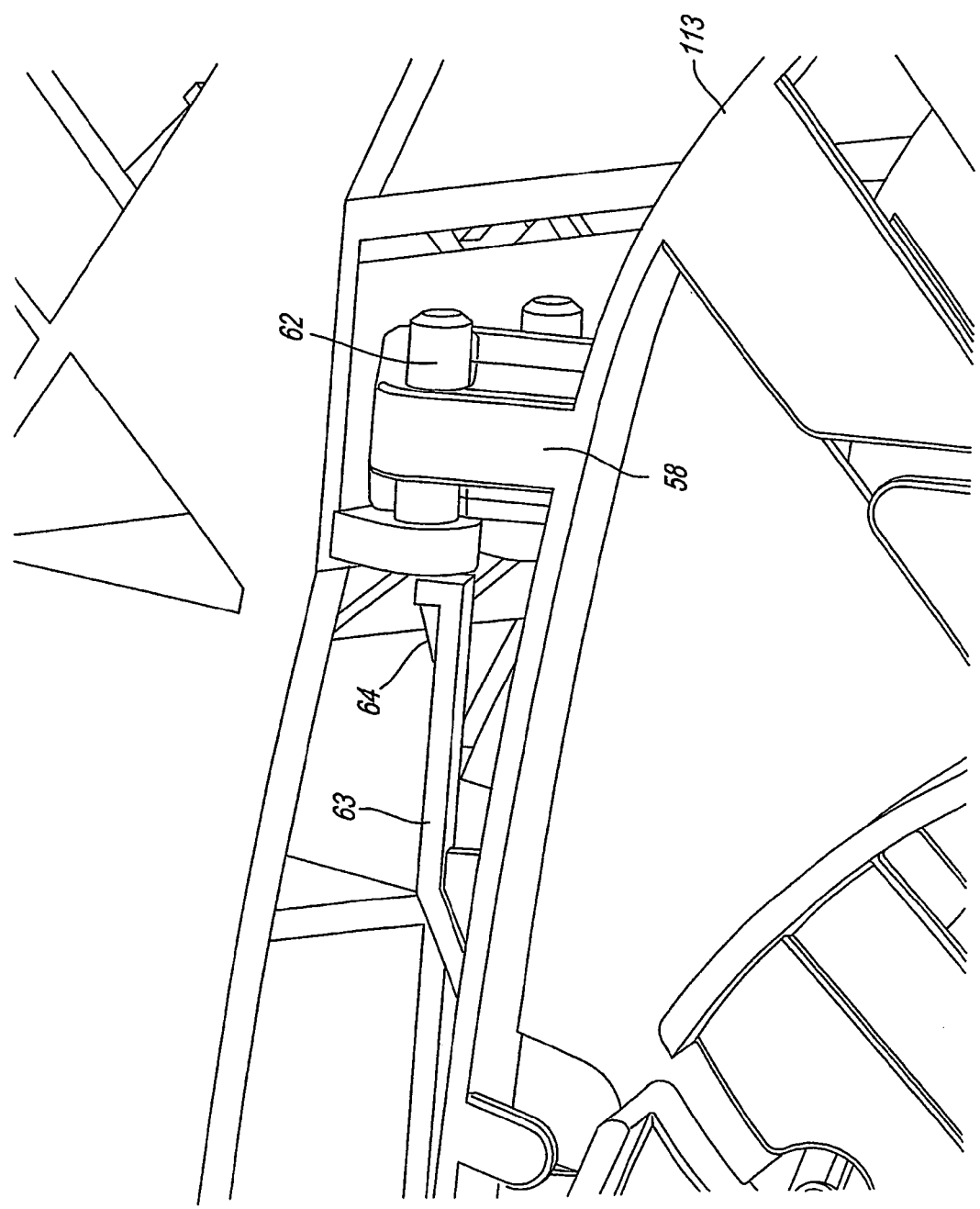
FIG. 12 is an enlarged partial perspective view showing a tray attached to a module.

FIG. 5 is a perspective view of a first tray suitable for use with the assembly of FIG. 1. The tray 13 is generally in the form of a plate 55 having a surrounding lip 56 with a gap in the region 54 to allow a fibre to enter in the direction of arrow A or exit in the direction of arrow B. The tray is designed to be mounted on the module/post assembly so as to be pivotable about an axis X—X indicated in FIG. 5. Thus, the tray 13 is provided with a pin 57 extending outwardly along the axis X—X and a socket member 58 defining open ended cylindrical socket 59 extending along the same axis. The tray additionally has a spring clip 63 attached to and extending approximately parallel to the axis X—X having a ramp surface 64 (see FIG. 11). Each pin 57 is received in a hole 61, one of which is indicated in FIG. 3, in the side wall 17 of the module 12. Each socket 59 in use receives a cylindrical shaft 62 provided on the module 12 so as to be aligned with the corresponding hole 61. Each shaft 62 is spaced from the remainder of the module 12 and is secured thereto by a bracket 66 at one end of the shaft. The shape of the shafts 62 and their supporting brackets 66 are such as to allow a tray to be attached to a module 12 by aligning a hole 61, a pin 57, a shaft 62 and a socket member 58 and sliding the tray with respect to the module so that the pin 57 is received in the hole 61 and simultaneously a shaft 62 slides into a socket 59. As a shaft 62 slides into socket 59, so the surface of the corresponding bracket 66 slides along the ramp surface 64 of the spring clip 63 until the spring clip latches into place on the opposite side of the bracket from the shaft 62, as shown in FIG. 12, preventing further movement along the X—X axis. The tray can now only be removed from the module by manual pressure on the spring clip 63 to flex it inwardly towards the lip 56. The brackets supporting the shafts 62 and/or the means supporting the pins 57 are shaped so as to limit the travel of the pins 57 into the hole 61 such that at the end of its travel the tray is pivotably mounted to the module 12.

Figure 6:
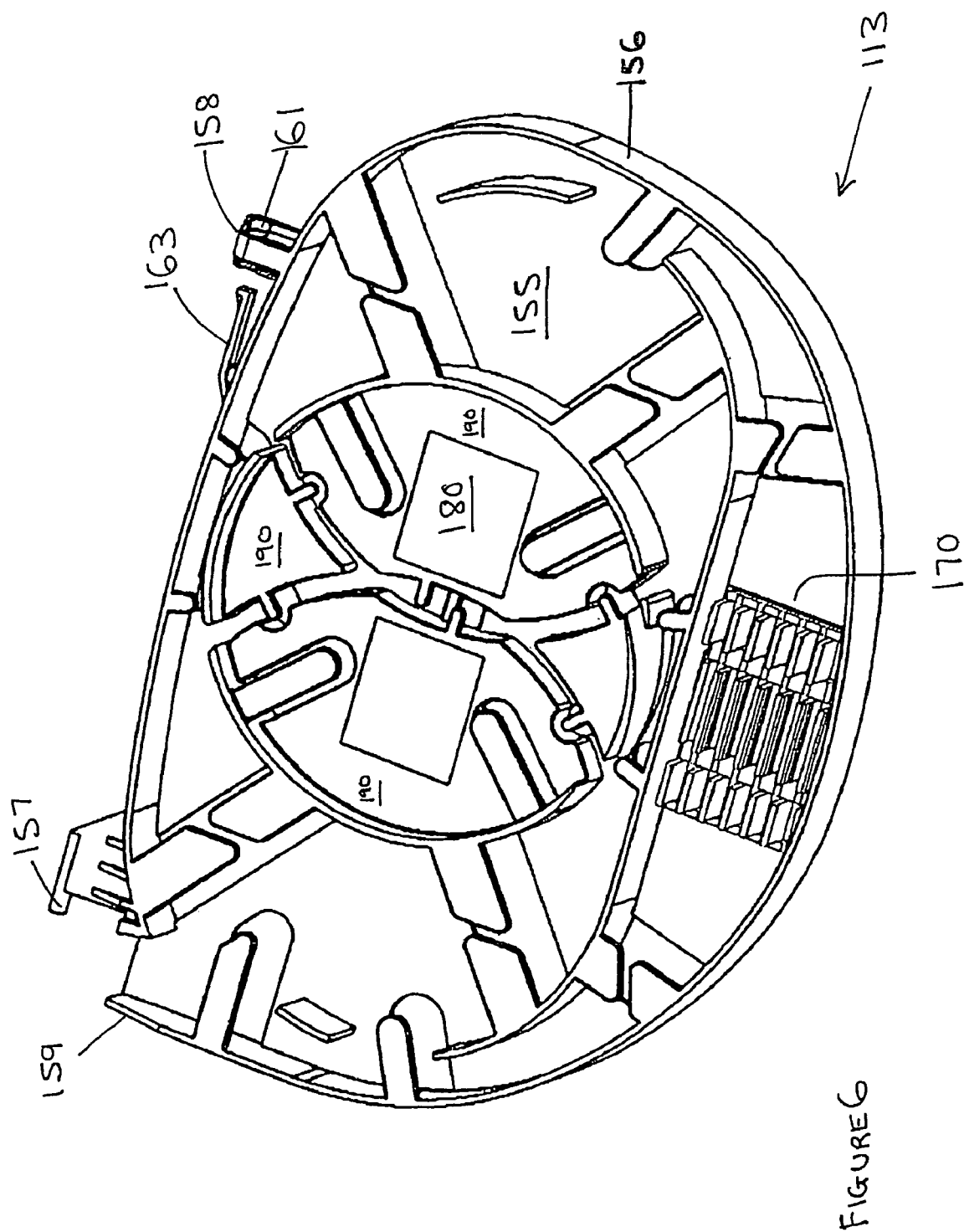
FIG. 6 is a perspective view of a second tray suitable for use with the assembly of FIG. 1.
Figure 7:
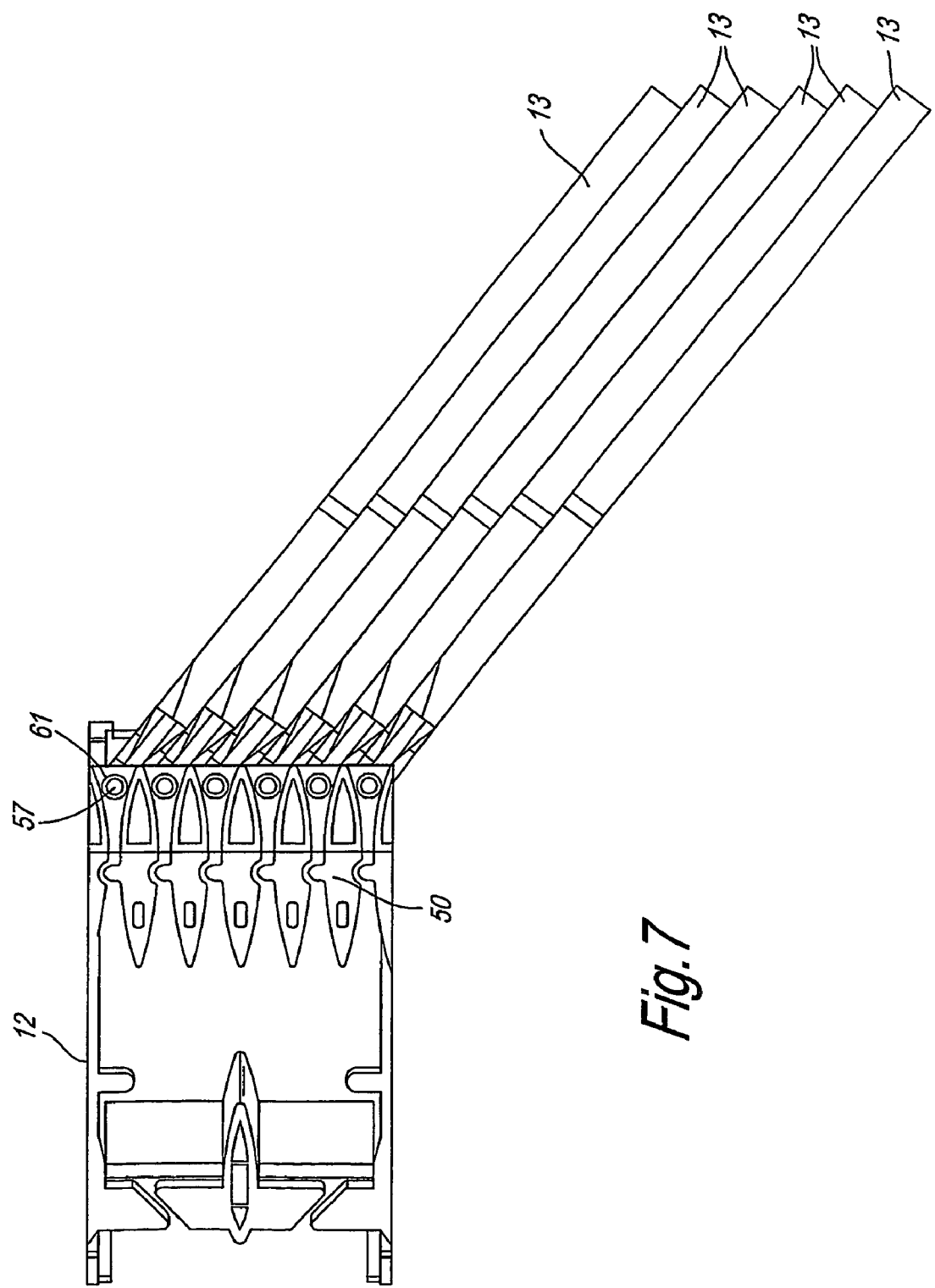
FIG. 7 is a side elevation of a module to which six identical trays are attached.
Figure 8:
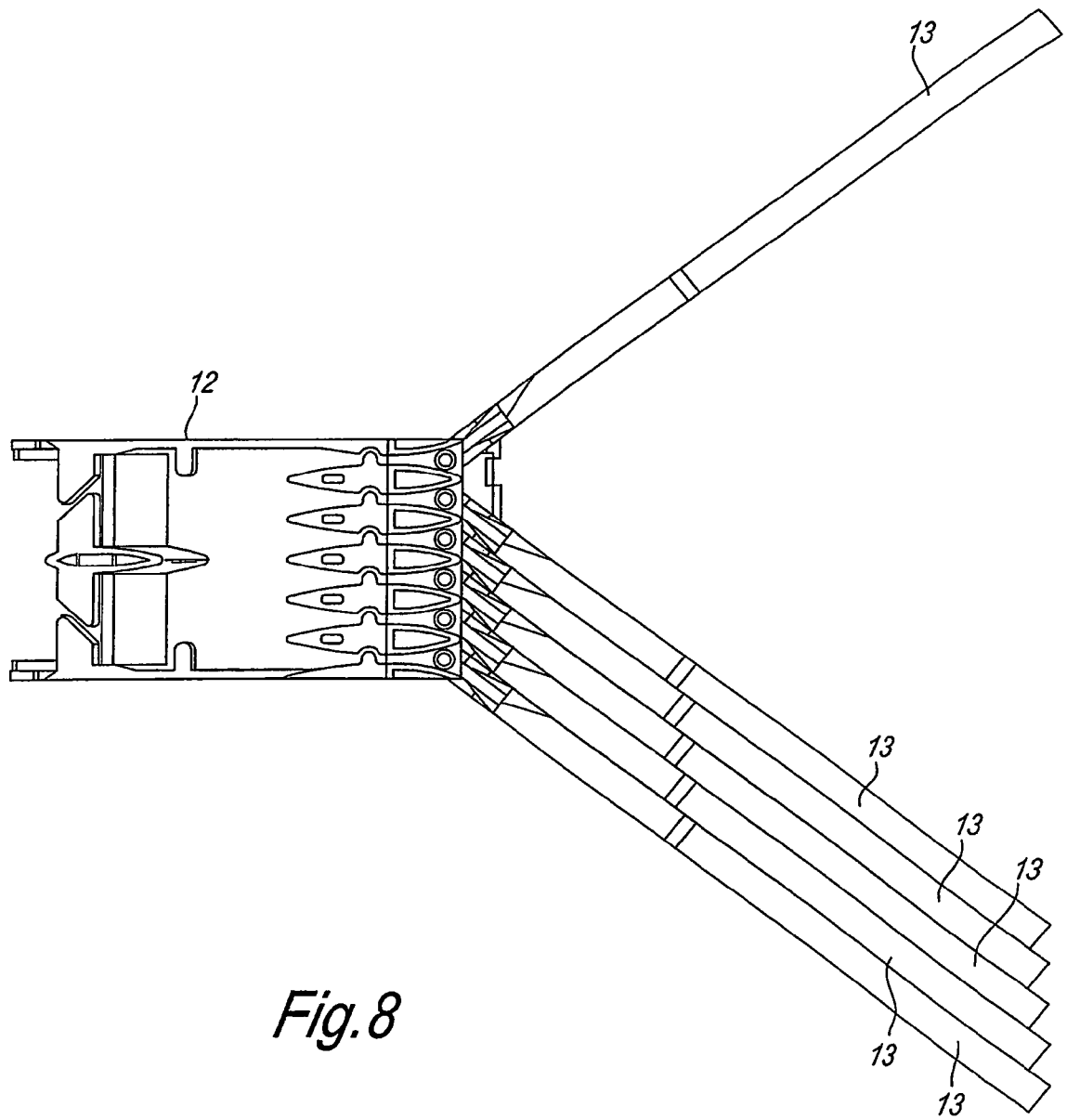
FIG. 8 is a side elevation similar to FIG. 7 showing one tray pivoted away from the others for ease of access to fibres in the tray below.
Figure 9:
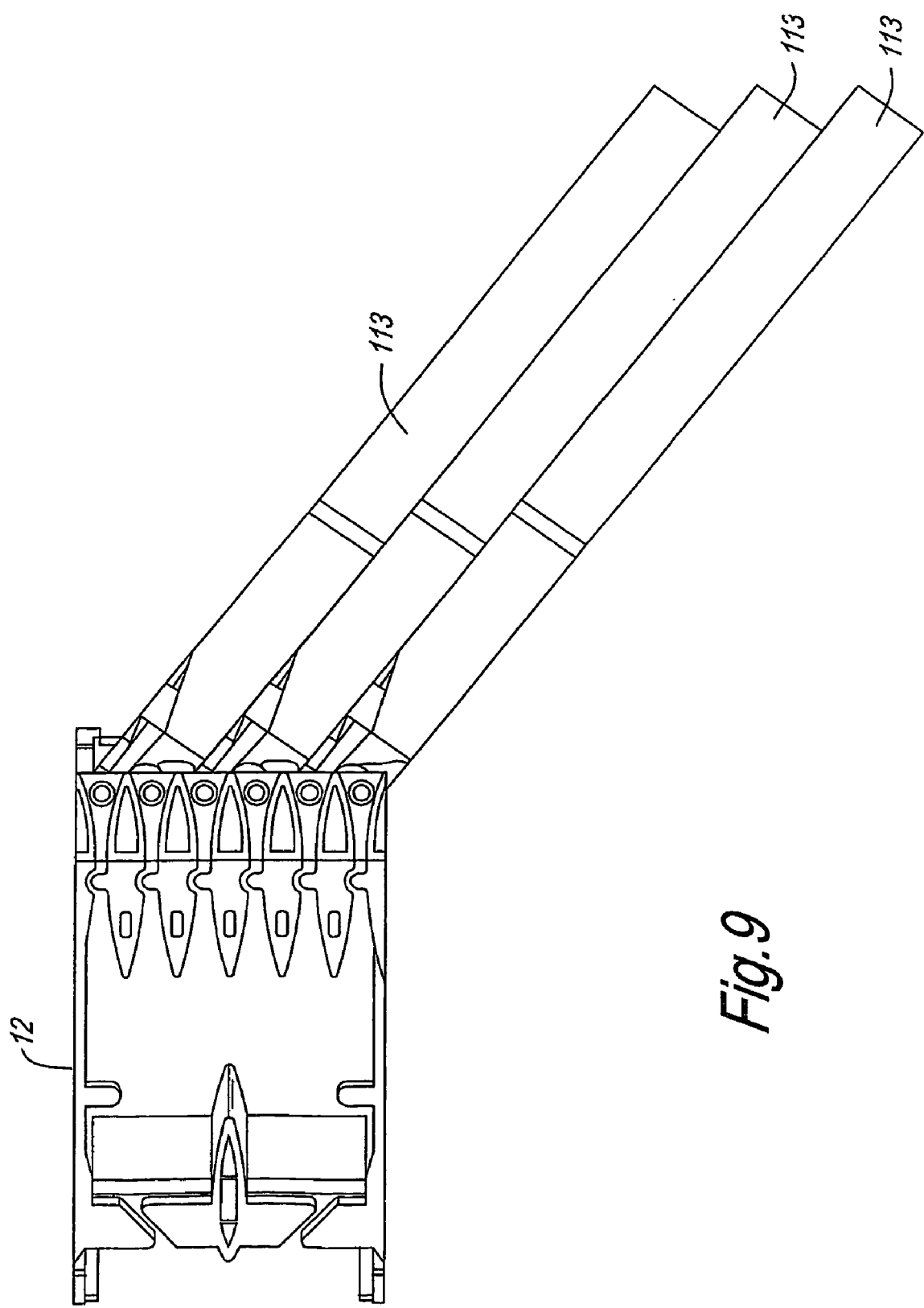
FIG. 9 is a side elevation similar to FIGS. 7 and 8 showing a module having three identical thickness trays attached.
Figure 10:
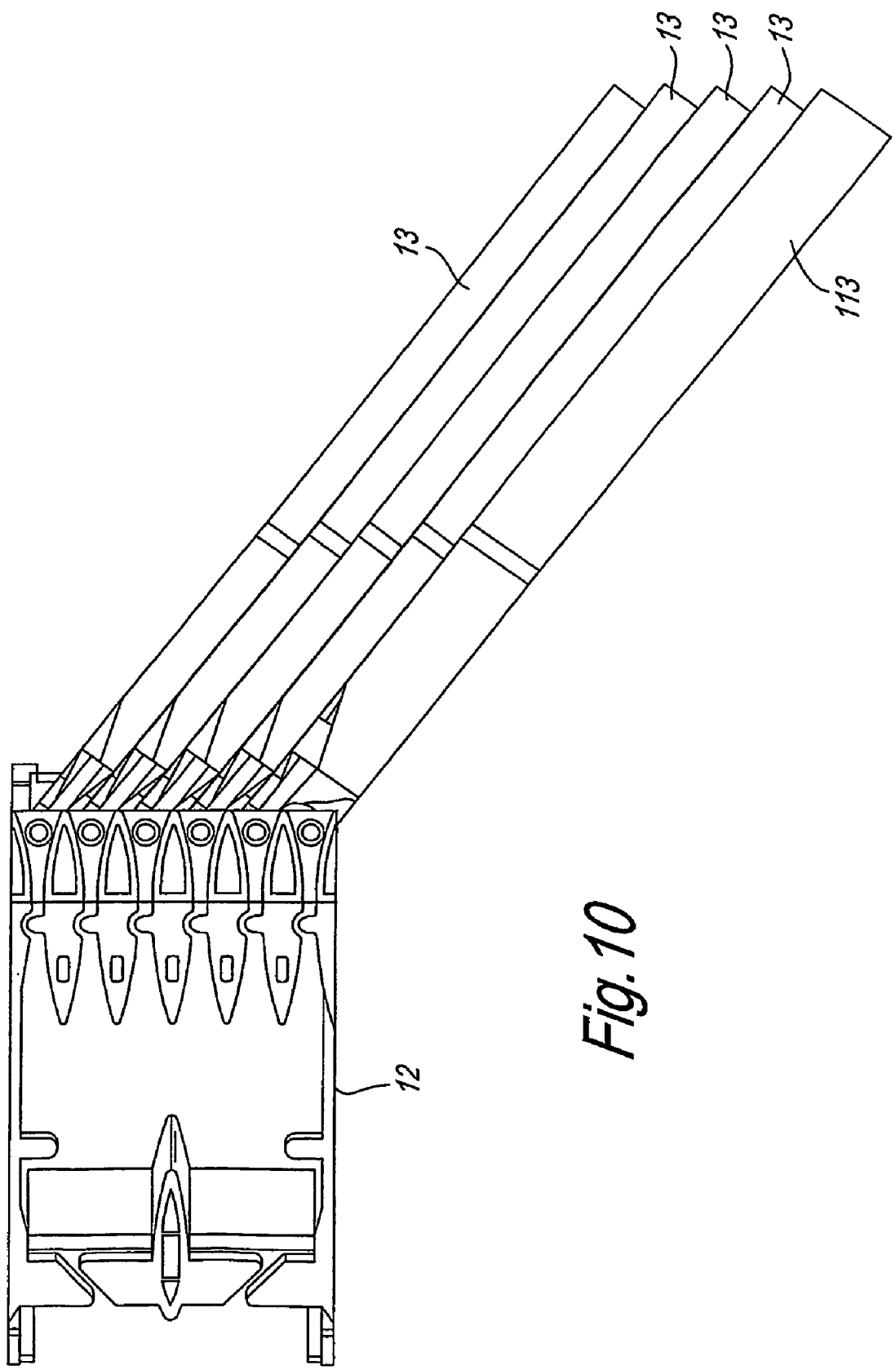
FIG. 10 is a side elevation of a module to which are attached four modules as shown in FIG. 5 and one module as shown in FIG. 6.

Each tray 13 has upstanding ribs for guiding optical fibres as is known in the art as well as overhanging portions for preventing the fibres from lifting from the tray. The tray illustrated in FIG. 5 has a region generally indicated at 80 for storing so-called "dark fibre" as well as a second region 70 in which lit fibre is looped. The surfaces of regions 70 and 80 are substantially coplanar. Region 70 may include a removable fibre retaining block as is common in the art. FIG. 6 illustrates a tray similar to the one illustrated in FIG. 5 and like parts in FIG. 6 are given the same reference numerals, increased by 100. The lip 156 of the tray 113 is twice as deep as the lip 56 of the tray 13. The region 180 for storing dark fibre has a surface 190 which is raised above the plate 155 so that dark fibre is stored on a different level from lit fibre in the region 170.

In both versions of the tray 13, 113, the lip 56, 156 is chamfered in the region where fibres enter and exit, as indicated by reference numerals 59, 159 to avoid the fibres snagging on a sharp corner.

In a typical application a tray 13 would typically accommodate 4 fibres whereas a tray 113 would accommodate 12 fibres, stacked above each other. Variations on this arrangement are of course possible.

As shown in FIGS. 7 to 10, a variety of combinations of the trays shown in FIGS. 5 and 6 can be attached to a module. In the case where one or more double-depth modules is used, as shown in FIG. 6, some of the locating holes 61 and shafts 62 on the module 12 will be redundant.

Figure 13:
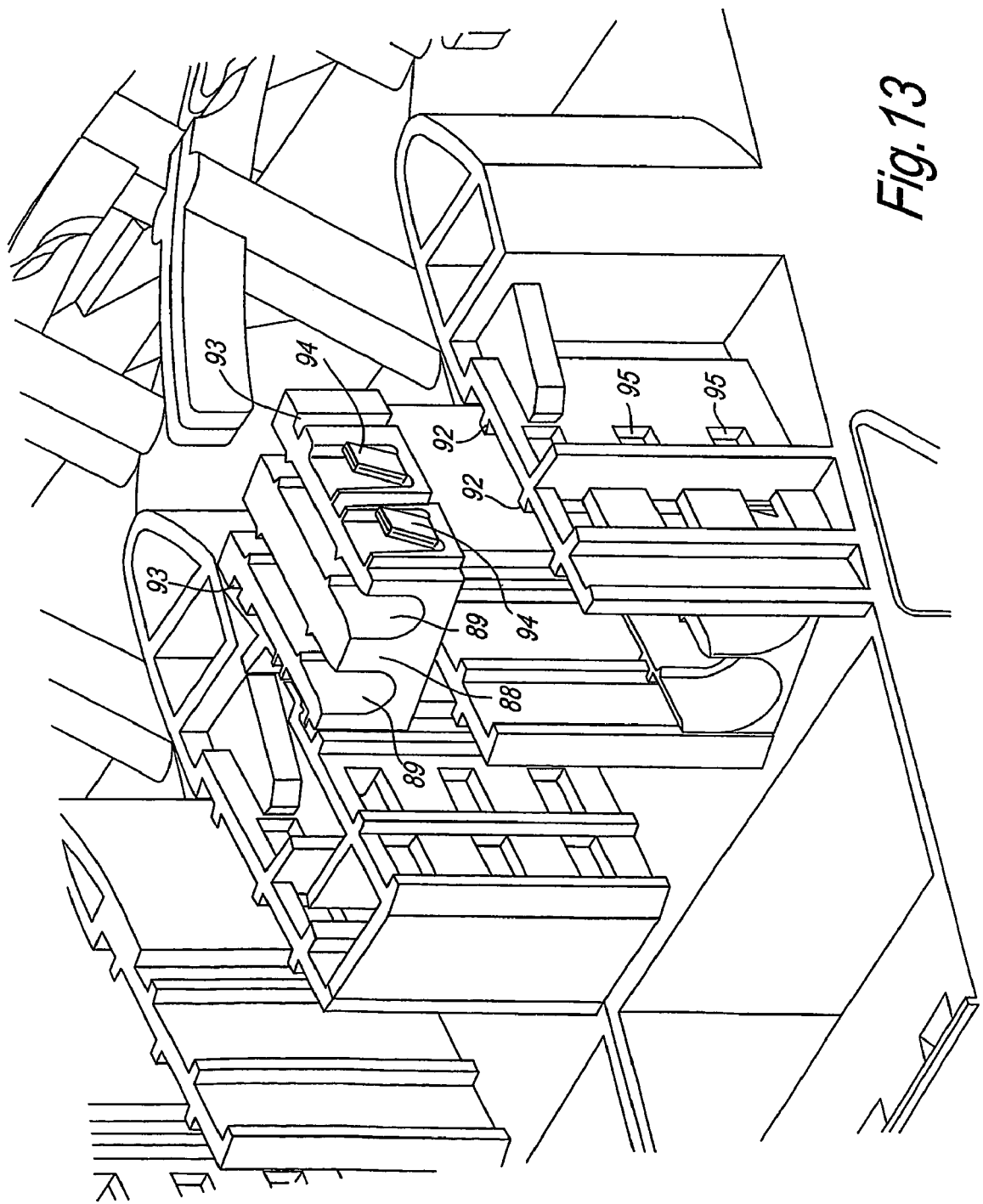
FIG. 13 is an enlarged partial perspective view showing a buffer tube retaining block about to be inserted in a channel in the entry zone.

FIG. 13 illustrates in more detail the manner in which buffer tubes are received by the module 12. As shown, a buffer tube retaining block 88 may be inserted between the ribs 27, 28, 29 of the first set of ribs having a number of channels 89, in this example two, for receiving a buffer tube. The ribs 27, 28, 29 and blocks 88 have cooperating ribs 92 and grooves 93 for locating the block 88. Up to three blocks 88 may be stacked one above the other in each channel. The side surfaces of the blocks 88 are provided with flexible tabs 94 which engage in holes 95 provided on the ribs 27, 28, 29 to retain them in place. Instead of providing ribs 92 and grooves 93, the blocks may be received between the ribs 27, 28, 29 as an interference fit.

The assembly according to the invention may be used to store uncut or spliced fibres but it is particularly advantageous over currently available assemblies for storing uncut fibres. This is because firstly the structure does not require any portion of the fibres to be threaded through holes or channels—all of the fibre guiding channels have an open structure—and secondly the fibres enter and exit the trays in the same region of the trays and thus enter and exit the modules from the trays at the same region of the modules.

The curvature of the outer surface of the side wall 17 ensures that a minimum bend radius of fibres is maintained. In other words the fibres are not coiled too tightly in a manner which could impair their performance. Referring to FIG. 14 which shows fibres 200 being led to trays, this minimum radius is maintained even when the trays are at their maximum inclination with respect to the module 12. The minimum bend radius is also maintained when the fibres are routed within the trays. The curvature of the side wall 17 is designed such that fibres enter the trays tangentially to their curved paths within the trays.

Figure 16:
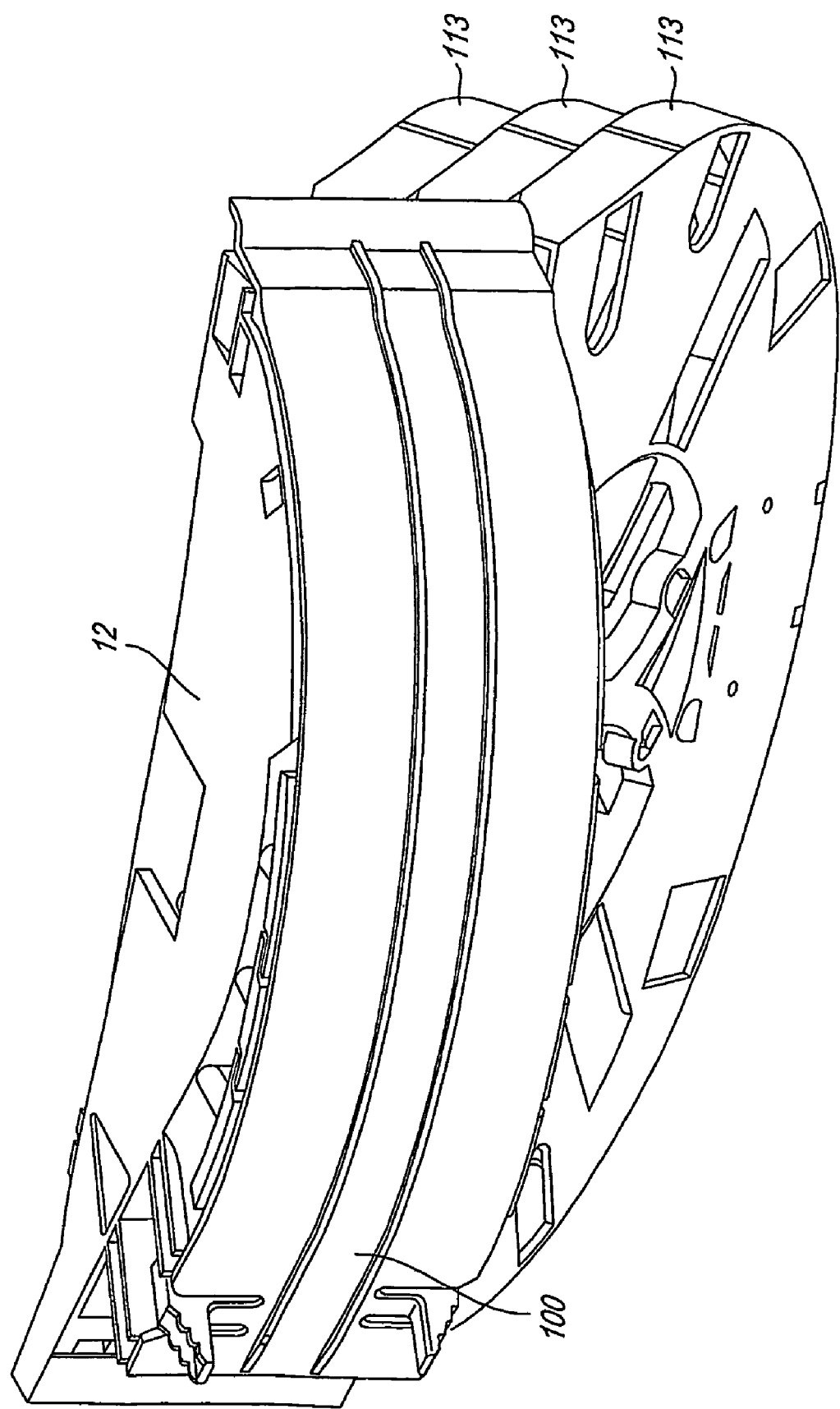
FIG. 16 is a perspective view of a module with a cover clipped onto it.

Each module may be provided with a transparent removable cover 100 as shown in FIG. 16 which simply clips around the side wall 17 to protect the fibres.

What is claimed is:

1. An optical fiber management assembly comprising a support module and a plurality of optical fiber storage trays each mounted to the support module so as to be pivotable about an axis extending along one edge of the tray and parallel to a major surface of the tray, the support module having at least one rib on an outer surface thereof for guiding fibers from an entry zone in a first region of the surface of the support module to a tray selection zone from which the fibers are guided to respective trays.

2. An assembly as claimed in claim 1 in which at least some of the ribs have overhanging portions extending parallel to the surface of the module for retaining fibers in their respective channels.

3. An assembly as claimed in claim 1 in which the surface of the support module includes a distribution zone between the entry zone and the tray selection zone having one or more openings at the edges of the surface of the module enabling fibers to be guided to another module.

4. An assembly as claimed in any preceding claim 1 in which at least a part of the tray selection zone has barriers at the edges of the surface of the module to keep fibers within the extent of the module surface.

5. An assembly as claimed in claim 1 in which the entry zone includes channels for receiving buffer tubes.

6. An assembly as claimed in claim 5 in which the buffer tube channels are dimensioned to hold buffer tubes in a friction fit.

7. An assembly as claimed in claim 6 in which the buffer tube channels are defined in blocks which are attachable to the surface of the module.

8. An assembly as claimed in claim 1 in which the trays are releasably secured to the module.

9. An assembly as claimed in claim 8 in which the trays are attachable to the module by sliding along the pivot axis.

10. An assembly as claimed in claim 9 including means for preventing movement of the trays along the pivot axis.

11. An assembly as claimed in claim 8 in which each tray has at least one shaft extending along the pivot axis which is received in a hole in the module.

12. An assembly as claimed in claim 8 in which each tray has at least one socket for receiving a shaft extending along the pivot axis provided on the module.

13. An assembly as claimed in claim 1 in which the trays have means for guiding optical fibers such that fibers enter and leave the trays in the same region of the tray.

14. An assembly as claimed in claim 1 in which the support module and trays encircle a support post.

15. An assembly as claimed in claim 14 in which the support module has a channel in which the support post is received, which channel is closed by the trays.

16. An assembly as claimed in claim 15 in which the module and/or trays are releasably secured to the support post.

17. An assembly as claimed in claim 14 in which the support post extends beyond the module in a direction perpendicular to the pivot axis whereby to support one or more additional modules in an aligned stack.

18. An assembly as claimed in claim 1 wherein the support module has an arcuate outer surface whereby fibers are guided while maintaining a minimum bend radius.

19. An assembly as claimed in claim 18 wherein the arcuate outer surface of the support module is so shaped that fibers enter the trays from the support module at a tangent to their paths within the trays.

20. An assembly as claimed in claim 1 wherein said at least on rib defines a transition for fibers extending from the module to the trays adapted to maintain a minimum fiber bend radius in all possible angular positions of the trays.

21. An assembly as claimed in claim 1 in which each tray has a region for storing dark fibers and a separate region for storing lit fibers.

22. An assembly as claimed in claim 21 in which the tray has a region with a raised surface for storing dark fibers.

23. An assembly as claimed in claim 1 in which the support module is provided with a transparent removable cover which covers the channels in use.

24. A kit of parts forming a support module and a plurality of optical fiber storage trays which, when assembled, form an assembly comprising a support module and a plurality of optical fiber storage trays each mounted to the support module so as to be pivotable about an axis extending along one edge of the tray and parallel to a major surface of the tray, the support module having at least one rib on an outer surface thereof for guiding fibers from an entry zone in a first region of the surface of the support module to a tray selection zone from which the fibers are guided to respective trays, wherein at least two of the trays are of different depth.

25. A kit as claimed in claim 24 in which the depth of one tray is an integral multiple of the depth of another tray whereby the module can accommodate said two depths of tray in a plurality of combinations.

* * * * *

UNITED STATES PATENT AND TRADEMARK OFFICE
CERTIFICATE OF CORRECTION

PATENT NO. : 7,054,535 B2
APPLICATION NO. : 10/486981
DATED : May 30, 2006
INVENTOR(S) : Spayes et al.

It is certified that error appears in the above-identified patent and that said Letters Patent is hereby corrected as shown below:

Col. 5, Claim 4 should read as follows:

4. An assembly as claimed in claim 1 in which at least a part of the tray selection zone has barriers at the edges of the surface of the module to keep fibers within the extent of the module surface.

Signed and Sealed this

Fifteenth Day of August, 2006

JON W. DUDAS
*Director of the United States Patent and Trademark Office*